United States Patent Office 3,666,617
Patented May 30, 1972

3,666,617
FIRE RETARDANT LAMINATES
Harry W. Marciniak, Tonawanda, N.Y., assignor to Hooker Chemical Corporation, Niagara Falls, N.Y.
No Drawing. Continuation-in-part of application Ser. No. 686,772, Nov. 29, 1967. This application May 22, 1970, Ser. No. 39,917
Int. Cl. B32b 15/08; H05k 1/00
U.S. Cl. 161—186                                14 Claims

ABSTRACT OF THE DISCLOSURE

A fire retardant, non-blistering laminate is produced by impregnating the uppermost ply of a multi-ply laminate with a resin in which the fire retardant additive is absent. If fire retardant requirements permit, one or more additional plies can be additive-free in order to provide improved strength, economy or for other purposes.

REFERENCE TO PRIOR APPLICATION

This is a continuation-in-part of application Ser. No. 686,772, filed Nov. 29, 1967 and now abandoned.

BACKGROUND OF THE INVENTION

Fire retardant laminates have substantial uses in industry. They may be usefully employed, for example, in the art of printed circuit manufacture wherein panels comprising a metal sheet laminated to a resin base are printed to produce a desired electrical circuit.

Laminated panels for the manufacture of printed circuits are commonly made by laminating resin impregnated paper sheets in which a fire retardant has been added to produce a fire retardant resin paper base to which the metal sheet is adherent. Such laminated panels are subject to a number of disadvantages. One disadvantage arises out of the fact that in the course of manufacture of printed circuits, the laminate is brought into contact with a molten soldering bath at a moderately high temperature, and the consequential heating of the laminated panel causes difficulties. For example, this heating of the panel may cause the metal cladding to blister. Another disadvantage of the prior art laminate is that the adhesion of the metal to the base laminate varies considerably.

It is an object of this invention to provide a laminate which is both fire retardant and resistant to blistering. Another object of the invention is to provide a simple and effective method for laminating a metal to a resin base to form a laminate wherein the metal foil is strongly adherent to the resin base. A further object of the invention is to provide a metal-clad plastic panel adapted to be used in printed circuit manufacture wherein the metal foil and resin base are strongly and uniformly bonded to one another over the entire area of the adjoining surfaces. Still other objects of the invention will become obvious to those skilled in the art in view of the following disclosure.

SUMMARY OF THE INVENTION

This invention relates to a process for producing laminates which are fire retardant and non-blistering, and to the novel laminates produced thereby. More particularly, this invention relates to a process which comprises impregnating the ply adjacent to the metal of a multi-ply laminate with a resin in which no fire retardant additive is present, and wherein one or more of the remaining plies can be left free from the fire retardant additive; and to the novel laminates produced thereby.

DESCRIPTION OF THE PREFERRED EMBODIMENT

In accordance with the preferred embodiment of this invention, a typical procedure for the preparation of such laminates can comprise the following steps: The laminating resin is emulsified by vigorous stirring and a fire retardant additive is blended in by continuous stirring. The modified resin is then coated on sheets of suitable reticulate reinforcing structure such as paper, glass mat or cloth, and the excess rolled off until the reinforcing structure is reasonably dry. The sheets are subjected to 110° C. for five minutes to flash off the solvents and produce a flexible "prepreg" of about 5 to about 50 mils thick, preferably about 10 to about 25 mils thick. The prepregs are stacked and one prepreg constructed in the above manner without additives is placed on top. A piece of copper foil or other metal foil such as aluminum, silver, gold, solder, tin, nickel and the like, generally between about 0.01 to about 0.001 inch thick, is carefully cleaned, and placed on the unmodified prepreg. Mold lubricants or parting sheets can also be employed. The resulting composite structure is heated under pressure to provide a panel comprising a reinforced resin base having the foil firmly adherent thereto. The resulting panel may desirably be subjected to a suitable post-cure treatment.

As indicated in the foregoing description of a typical procedure, it is desirable in the manufacture of printed circuit panels that the plastic base be reinforced with a suitable reinforcing medium, preferably a fibrous material either in the form of loosely matted fibers, or in the form of woven cloth, or paper sheets or in the form of fibers disbursed throughout the plastic. The use of such fibrous reinforcement is known per se in the art, and in general, any of the material previously proposed for this purpose may be used in the present process. Thus, the fibrous reinforcement can be composed of an inorganic material such as glass, asbestos, mica, silica or ceramic; or an organic material such as cotton, paper, and the like; or a mixture of different fibrous materials.

The resins employed in this invention are those known in the art and generally form about 20 to about 70 percent by weight of each ply based on the total weight of the resin and reinforcing medium. Typical resins are the epoxies such as the reaction product of epichlorohydrin and bisphenol A, and the like; silicones such as silicone rubber or polymers based on silicon, oxygen and organic groups, and the like; phenolics such as phenolformaldehydes (alkaline- or acid-catalyzed), and the like; allyls such as diallyl phthalate, and the like; melamines; polyesters such as the reaction product of a polyhydric alcohol and a polycarboxylic compound; and the like resins.

The fire retardant additive is generally added in amounts from about 2 to about 50 weight percent based on the weight of the resin plus additive. The resulting resin composition is fire retardant, i.e., at least self-extinguishing by the ASTM D635 test method. Among the normally solid fire retardants having a melting point greater than about 210° C. which can be employed in the laminates are triallylphosphine oxide; tetrachlorophthalic anhydride; tetrabromophthalic anhydride; chlorendic acid and anhydride; 1,4,7,10 - dimethanocycloocta - 1,2,3,4,7,8,9,10,13, 12a - dodecahydro - [1,2,5,6] dibenzene; perchloropenta-13,14,14 - dodecachloro - 1,4,4a,5,6,6a,7,10,10a,11,12, cyclodecane; hexachlorocyclopentadiene - tetrahydrophthalic anhydride adduct; 2,3 - dicarboxy - 5,8 - endomethylene - 5,6,7,8,9,9 - hexachloro - 1,2,3,4,4a,5,8,8a-octahydronaphthalene anhydride; and the like. Inorganic fire retardants include antimony oxide, ammonium sulfate, anhydrous sodium borate, anhydrous sodium silicate; anhydrous sodium arsenate; anhydrous sodium tungstate; anhydrous sodium acetate; anhydrous potassium carbonate; anhydrous potassium silicate, anhydrous calcium chloride; zinc phosphate; and the like. The additives impart fire retardancy by decomposing and evolving a gas.

The metal cladding is bonded to the plies in the conventional manner, i.e., either without additional adhesives or with pre-applied adhesive coating. When an adhesive is employed, it must be of the type which will not gas when heated to at least about 210 degrees centigrade. Typical adhesives include phenolics modified with synthetic elastomers, nitrile-phenolics, and modified or unmodified epoxides.

It was discovered that the fire retardant additive, particularly the halogen containing additives, often decomposes somewhat upon heating and forms bubbles. Since the copper foil has no rigidity, these bubbles cause the foil to blister. The process of this invention eliminates this blistering by employing a resin free from fire retardant additive in the uppermost ply of the laminate. As used herein, uppermost ply means the ply which is bonded to the copper foil. Elimination of the fire retardants serves the dual function of strengthening the bond between the uppermost ply and the foil, and eliminating the source of the blistering. The elimination of the additive also allows less heat to penetrate into the first additive impregnated (secondary) ply, causing a lesser degree of decomposition of the additive therein. The bond between said secondary ply and the uppermost ply, and the bond between the uppermost ply and the foil, are sufficiently strong to prevent the foil from blistering. Prior to this invention, it was not known that the fire retardant additive could be eliminated from the uppermost ply without substantially lessening the fire retardant nature of the laminate.

If fire retardancy requirements permit, one secondary ply can be without flame retardant additive, or several such secondary plies can be staggered throughout the laminate for improved strength or other purposes.

The following examples serve to illustrate the invention but are not intended to limit it. Unless otherwise specified, all temperatures are in degrees centigrade and all parts are understood to be expressed in parts by weight.

Example 1

A 9 ply laminate was constructed from 10 mil cotton linter paper, one ounce copper foil and a polyester resin of dicumyl peroxide, styrene, methyl alcohol, phthalic anhydride, maleic anhydride, propylene glycol and a phenol formaldehyde. The uppermost ply was impregnated with a blend of 100 parts resin and 1 part of trichlorobenzene (boiling point 218° C.). The remaining 8 secondary plies were impregnated with a blend of 100 parts of said resin, 8.3 parts of antimony trioxide ($<1\mu$ particle size), and 16.6 parts of 1,4,7,10 - demethanocycloocta-1,2,3,4,7,8,9, 10,13,13,14,14 - dodecachloro - 1,4,4a,5,6,6a,7,10,10a,11, 12,12a-dodecahydro[1,2,5,6]dibenzene (2–5$\mu$ grind) (a fire retardant). The impregnated sheets were dried briefly for 5 minutes at 110° centigrade to form "prepregs." These prepregs were then stacked with an epoxy adhesive coated foil and heated under pressure for 10 minutes at 149° C.

The laminate was tested by the National Electrical Manufacturers Association (NEMA) Solder Float Test LI 1–10.11 which requires that a one-inch square of copper clad laminate be floated on 260° C. molten solder for 10 seconds without foil or interlaminar blistering. The foil blistered within the 10 seconds specified in said test. Since the one percent level of trichlorobenzene is not expected to interfere with the adhesive characteristics of the foil to the uppermost ply, it can be seen that blistering does not depend on the strength of the foil-uppermost ply bond. Gas formed because the temperature exceeded the boiling point of the trichlorobenzene, and blistered the foil.

Example 2

A laminate was prepared as in Example 1 except all nine plies contained the fire retardant additive. The laminate was subjected to NEMA Solder Float Test LI 1–10.11. The foil blistered within the 10 seconds specified in said test.

Example 3

A nine ply laminate was constructed from 10 mil cotton linter paper and the polyester resin of Example 1. A one ounce copper foil coated with an epoxy type adhesive was used. The uppermost ply was impregnated with the unmodified resin. The remaining 8 secondary plies were impregnated with a blend of 100 parts of said resin, 8.3 parts of antimony trioxide, and 16.6 parts of the fire retardant used in Example 1. The preparation of the prepregs and the laminate was in the conventional manner.

The resulting laminate was tested by the ASTM-D-635 Flammability Test three times, applying the flame to both the portion covered by the foil and non-covered portion. It exhibited flame out times of 4, 2 and 2 seconds, for an average flame out time of 2.6 seconds.

Example 4

The laminate of Example 3 was tested by the National Electrical Manufacturers Association Solder Float Test LI 1–10.11. Blistering was not observed within the 10 seconds of float time specified in said test. Additional tests with float times of up to 60 seconds also did not result in blistering of the copper foil.

Example 5

A laminate was constructed as in Example 3 except that no metal foil was employed. The laminate was subjected to the ASTM–D–635 Test three times, applying the flame to both sides of the article. It exhibited flame out times of 7.0, 7.5 and 7.0 seconds for an average flame out time of 7.2 seconds.

Example 6

A laminate was constructed as in Example 3 except that the two plies immediately adjacent to the foil were free from fire retardant additive. The laminate was tested by the ASTM–D–635 method, applying the flame to both sides of the article. Flame out of times 9.0, 10.0 and 7.0 seconds were recorded for an average of 8.6 seconds.

Various changes and modifications can be made in the process and products of this invention without departing from the spirit and scope of the invention. The various embodiments of the invention disclosed herein serve to further illustrate the invention but are not intended to limit it.

I claim:

1. A fire retardant laminated article consisting essentially of a metal foil and adhering to at least one surface thereof, successive layers of reticulate reinforcing medium selected from the group consisting of organic fibers, inorganic fibers and mixtures thereof, said layers being impregnated with a laminating resin wherein the resin-impregnated layer adjacent to the metal foil is free of fire retardant additives and at least one of said successive layers contains an effective fire retardant proportion of a normally solid fire retardant additive which upon decomposition evolves a gas.

2. The fire retardant laminated article of claim 1 wherein said laminating resin is selected from the group consisting of epoxy resins, silicone resins, phenolic resins, allyl resins, melamine resins, polyester resins, and mixtures thereof.

3. The fire retardant laminated article of claim 1 wherein said laminated resin is a polyester resin.

4. The fire retardant laminated article of claim 1 wherein said laminating resin is a mixture of a polyester resin and a phenolic resin.

5. The fire retardant laminated article of claim 1 wherein said fire retardant additive is 1,4,7,10-dimethanocycloocta-1,2,3,4,7,8,9,10,13,13,14,14 - dodecachloro-1,4,4a,5,6,6a,7,10,10a,11,12,12a - dodecahydro[1,2,5,6] dibenzene.

6. The fire retardant laminated article of claim 1 wherein the resin impregnated layer adjacent to said metal foil is free of fire retardant additives and all other successive layers contain a gas evolving fire retardant additive in an effective fire retardant proportion.

7. The fire retardant laminated article of claim 6 wherein said fire retardant additive is 1,4,7,10-dimethanocycloocta-1,2,3,4,7,8,9,10,13,13,14,14 - dodecachloro-1,4,4a,5,6,6a,7,10,10a,11,12,12a - dodecahydro[1,2,5,6] dibenzene.

8. A fire retardant laminated article consisting essentially of a metal foil and adhered to at least one surface thereof by an adhesive which will not gas when heated to about 210 degrees centigrade, successive layers of reticulate reinforcing medium selected from the group consisting of organic fibers, inorganic fibers and mixtures thereof, said layers being impregnated with a laminating resin wherein the resin-impregnated layer adjacent to said metal foil is free of fire retardant additives and at least one of said successive layers contains an effective fire retardant proportion of a normally solid fire retardant additive which upon decomposition evolves a gas.

9. The fire retardant laminated article of claim 8 wherein said laminating resin is selected from the group consisting of epoxy resins, silicone resins, phenolic resins, allyl resins, melamine resins, polyester resins, and mixtures thereof.

10. The fire retardant laminated article of claim 8 wherein said laminated resin is a polyester resin.

11. The fire retardant laminated article of claim 8 wherein said laminating resin is a mixture of a polyester resin and a phenolic resin.

12. The fire retardant laminated article of claim 8 wherein said fire retardant additive is 1,4,7,10-dimethanocycloocta-1,2,3,4,7,8,9,10,13,13,14,14 - dodecachloro-1,4,4a,5,6,6a,7,10,10a,11,12,12a - dodecahydro[1,2,5,6] dibenzene.

13. The fire retardant laminated article of claim 8 wherein the resin impregnated layer adjacent to said metal foil is free of fire retardant additives and all other successive layers contain an effective fire retardant proportion of a normally solid fire retardant additive which upon decomposition evolves a gas.

14. The fire retardant laminated article of claim 13 wherein said fire retardant additive is 1,4,7,10-dimethanocycloocta-1,2,3,4,7,8,9,10,13,13,14,14 - dodecachloro-1,4,4a,5,6,6a,7,10,10a,11,12,12a - dodecahydro[1,2,5,6] dibenzene.

References Cited
UNITED STATES PATENTS

| | | | |
|---|---|---|---|
| 2,912,746 | 11/1959 | Oshry et al. | 29—135.5 |
| 2,977,333 | 3/1961 | Runk et al. | 260—20 |
| 3,365,470 | 1/1968 | Schmerling | 260—346.6 |
| 3,423,371 | 1/1969 | Lusskin et al. | 260—75 |
| 3,473,992 | 10/1969 | Martello et al. | 161—218 |
| 3,473,993 | 10/1969 | Kepple et al. | 161—403 |
| 3,526,568 | 9/1970 | Kepple et al. | 161—218 |
| 3,526,573 | 9/1970 | Kepple et al. | 161—218 |
| 3,534,147 | 10/1970 | Bratton et al. | 161—403 |

JOHN T. GOOLKASIAN, Primary Examiner

W. E. HOAG, Assistant Examiner

U.S. Cl. X.R.

106—15 FP; 161—207, 213, 214, 215, 216, 219, 231, 247, 257, Dig. 7; 174—68.5; 252—8.1; 317—101 B